United States Patent
Wang et al.

(10) Patent No.: US 7,851,017 B2
(45) Date of Patent: Dec. 14, 2010

(54) METHOD AND APPARATUS FOR DUCT SEALING USING A CLOG-RESISTANT INSERTABLE INJECTOR

(75) Inventors: Duo Wang, Albany, CA (US); Mark P. Modera, Piedmont, CA (US)

(73) Assignee: The Regents of the University of California, Oakland, CA (US)

( * ) Notice: Subject to any disclaimer, the term of this patent is extended or adjusted under 35 U.S.C. 154(b) by 709 days.

(21) Appl. No.: 11/511,785

(22) Filed: Aug. 29, 2006

(65) Prior Publication Data
US 2007/0001030 A1    Jan. 4, 2007

Related U.S. Application Data

(62) Division of application No. 10/310,253, filed on Dec. 3, 2002, now Pat. No. 7,156,320.

(60) Provisional application No. 60/338,562, filed on Dec. 3, 2001.

(51) Int. Cl.
    B05D 1/02    (2006.01)
    B05B 1/24    (2006.01)
    B05B 7/06    (2006.01)
(52) U.S. Cl. ............................. 427/237; 427/422
(58) Field of Classification Search .................. 427/140, 427/236, 237, 421.1, 422; 239/128, 135, 239/139, 398, 418, 421, 423, 424, 424.5, 239/425.5, 132–132.3
    See application file for complete search history.

(56) References Cited

U.S. PATENT DOCUMENTS

| | | | |
|---|---|---|---|
| 3,408,007 A | | 10/1968 | Raichle et al. |
| 3,591,328 A | * | 7/1971 | Szappanyos et al. ........ 427/236 |
| 4,331,722 A | * | 5/1982 | Packo et al. .................... 138/97 |
| 4,454,174 A | * | 6/1984 | Koga ........................... 427/237 |
| 4,728,036 A | | 3/1988 | Bennett et al. |

(Continued)

FOREIGN PATENT DOCUMENTS

EP    0 283 192 A1    9/1988

(Continued)

OTHER PUBLICATIONS

Xu et al., "Commercial Thermal Distribution Systems: Final Report for CIEE/CEC," Lawrence Berkeley National Laboratory, Environmental Energy Technologies Division, Report LBNL-44320, p. 109-223, Dec. 1999.*

(Continued)

*Primary Examiner*—William Phillip Fletcher, III
(74) *Attorney, Agent, or Firm*—Fulbright & Jaworski L.L.

(57) ABSTRACT

A method for forming a duct access region through one side of a previously installed air duct, wherein the air duct has an air flow with an air flow direction by inserting an aerosol injector into a previously installed air duct through the access region. The aerosol injector includes a liquid tube having a liquid tube orifice for ejecting a liquid to be atomized; and a propellant cap. The method is accomplished by aligning the aerosol injector with the direction of air flow in the duct; activating an air flow within the duct; and spraying a sealant through the aerosol injector to seal the duct in the direction of the air flow.

1 Claim, 7 Drawing Sheets

U.S. PATENT DOCUMENTS

| | | | | |
|---|---|---|---|---|
| 4,994,307 | A | * | 2/1991 | Price et al. .................. 427/236 |
| 5,522,930 | A | * | 6/1996 | Modera et al. .............. 118/317 |
| 5,980,984 | A | * | 11/1999 | Modera et al. .............. 427/237 |
| 6,012,647 | A | | 1/2000 | Ruta et al. |
| 6,116,516 | A | | 9/2000 | Ganan-Calvo |
| 6,565,010 | B2 | * | 5/2003 | Anderson et al. .............. 239/8 |
| 2002/0092918 | A1 | | 7/2002 | Anderson et al. |

FOREIGN PATENT DOCUMENTS

| | | |
|---|---|---|
| EP | 1 136 134 A2 | 9/2001 |
| GB | 2 195 416 A | 4/1988 |
| WO | WO 03/047761 A1 * | 6/2003 |

OTHER PUBLICATIONS

Carrie, et al. "Experimental investigation of aerosol deposition on slot- and joint-type leaks", Report LBNL-48774, Lawrence Berkeley National Laboratory (Berkeley, California), p. 1-18 (Jul. 2001).

Modera et al., "Sealing ducts in large commercial buildings with aerosolized sealant particles", Report LBNL-42414, Lawrence Berkeley National Laboratory (Berkeley, California), p. 1-30 (Aug. 2001).

Carrie et al., "Laboratory and field testing of an aerosol-based duct-sealing technology for large commercial buildings", ASHRAE Transactions, vol. 108(I), p. 316-326 (2002).

Bayvel et al., "Liquid Atomization", Taylor & Francis (Washington D.C.), p. 280-287, 351-354 (1993).

Lefebvre, "Atomization and Sprays", Hemisphere Publishing (Washington D.C.), p. 296-301 (1993).

Carrie et al., "Particle deposition in a two-dimensional slot from a transverse stream", Aerosol Science and Technology, vol. 28 (No. 3), p. 253-246 (Mar. 1998).

Jump, et al., "Field measurements of efficiency and duct retrofit effectiveness in residential forced air distribution systems", proceedings of ACEEE Summer Study, Pacific Grove, CA, Aug. 1996, Lawrence Berkeley National Laboratory (Berkeley, California), (Aug. 1996).

Modera et al., "Residential filed testing of an aerosol-based technology for sealing ductwork", proceedings of ACEEE Summer Study, Pacific Grove, CA, Aug. 1996, Lawrence Berkeley Laboratory Report, LBL-38554.

Carrie et al., "Laboratory and field testing of an aerosol-based duct-sealing technology for large commercial buildings", Report LBNL-44220, Lawrence Berkeley National Laboratory (Berkeley, California), p. 1-28 (2002).

Carrie, et al., "Reducing the permeability of residential duct systems", Presented at the 16$^{th}$ AIVC Conference, Palm Springs, CA, Sep. 1995.

Xu, et al., "Commercial thermal distribution systems; Final Report for CIEE/CEC", Lawrence Berkeley National Laboratory, Environmental Evergy Technologies Division, Report LBNL-44320, p. 109-223 (Dec. 1999).

* cited by examiner

METHOD AND APPARATUS FOR DUCT SEALING USING A CLOG-RESISTANT INSERTABLE INJECTOR

CROSS REFERENCE TO RELATED APPLICATIONS

This application is a divisional application of U.S. application Ser. No. 10/310,253 filed Dec. 3, 2002, now U.S. Pat. No. 7,156,320 B2, which claims priority under 35 U.S.C. §119(e) from U.S. provisional patent application Ser. No. 60/338,562 filed Dec. 3, 2001, entitled "Compact aerosol-sealant injector system," each of which is hereby incorporated herein by reference.

STATEMENT REGARDING FEDERAL FUNDING

This invention was made with U.S. Government support under Contract Number DE-AC03-76SF00098 between the U.S. Department of Energy and The Regents of the University of California for the management and operation of the Lawrence Berkeley National Laboratory. The U.S. Government has certain rights in this invention.

REFERENCE TO A COMPUTER PROGRAM

Not Applicable.

BACKGROUND OF THE INVENTION

1. Field of the Invention

The present invention pertains generally to atomization and drying of liquids, particularly liquids that have a propensity to clog atomization devices, examples include, but are not limited to adhesives, sealants, coatings, and paint. The present invention pertains particularly to devices and methods used in the remote sealing of ducts, more particularly to the remote sealing of ducts used in heating, ventilation, and air conditioning (HVAC) systems, and yet more particularly to duct sealing systems using sealants propelled by heated gas.

2. Description of the Relevant Art

U.S. Pat. No. 5,522,930 (the '930 patent), incorporated herein by reference, discloses a method and device for sealing leaks remotely by means of injecting a previously prepared aerosol into a duct system to be sealed. However, the system uses an external heating source for drying of the diluted aerosols that are sprayed, nominally at room temperature. The aerosols are diluted to reduce particle size by means of evaporation, and thereby improve penetration of the duct system.

U.S. Pat. No. 5,980,984 (the '984 patent), incorporated herein by reference, discloses a method and device for remotely sealing ducts by calculating the particle sizes, and injecting them into a pressurized duct having unsealed leaks. The method of particle size calculation produces particles that have an optimized sealing ability, yet due to their optimized size are best transported by the bulk flow to the site of unsealed leaks. After properly configuring a duct system as outlined in the '984 patent, by determining the change of the duct pressure and flow during the sealing process it can be determined whether the duct has been sufficiently sealed.

Prior nozzles tested for use in duct sealing operations have included those manufactured by Delavan Spray Technologies, Bete: Industrial Spray Nozzles, PNR America, Schlick-Düsen, and Spraying Systems Co., as well as various counter-rotating vortex nozzles. These prior nozzles variously suffered from frequent clogging and/or a particulate spray cone angle too wide for direct injection within narrow ducts.

Narrow ducts form a limiting application for duct sealing applications. In residential homes, and small ducts in commercial systems, ducts may be as narrow as 100 cm. The narrow ducts set a limit to how wide of a spray cone angle may be for these applications. Spray cone angle is more fully developed and described in *Atomization and Sprays*, by Arthur H. Lefebvre, Hemisphere Publishing Company, 1978, pages 296-301, and are hereby particularly incorporated by reference. The concept relates to the conic shape of spray as it leaves a nozzle, and is typically measured photographically by viewing the included angle of the spray. For most commercial and residential duct sealing applications, the spray cone angle is preferably less than 20°, more preferably less than 15°, and most preferably less than 10°. While these spray angles work well in narrow ducts, they will also work well in wider ducts.

Counter-rotating vortex nozzles do not appear to have serious clogging problems, however they create large spray angles and require considerable dilution (e.g. nine parts liquid to one part solid) to make particles in a size range suitable for sealing ducts. Such large spray cone angles are unusable for sealing narrow ducts, as a large fraction of the overall spray output is immediately coated on the sides of the narrow duct, thereby reducing the availability of downstream sealant particles and thereby increasing sealing time.

Compressed-air nozzles use a propellant gas (typically air, although other gasses may be used), and a liquid feed to create smaller liquid particles, thereby reducing the amount of dilution required to create correctly sized smaller particles. The smaller particles also reduce the quantity of heat required to evaporate the diluent. By concentrating the heat in the propellant gas, heat is delivered more efficiently to the particles, further reducing heating requirements.

When the propellant gas is heated, preferably forming simple heated compressed air, clogging within the atomizer is increased. The present device includes the advantages of heated propellant gas, however mitigates heat-induced clogging by limiting heat transfer to the liquid to be atomized while the liquid is resident within the device.

Both the '930 and '984 patents teach the heating of the bulk gas flow into and through the duct. This heating serves the principal purpose of drying a volatile diluent added to a liquid sealant used for duct sealing. The diluent reduces the size of the sprayed sealant particles that remain after drying or desolvation, thereby producing the appropriate particle sizes required to penetrate and seal duct systems.

Diluting the sealant poses two problems. First, for the sealant to work effectively, the diluent (otherwise referred to as a solvent) must be evaporated so that the particles produced consist essentially of desolvated sealant material. Thus, dilution increases the heat requirements per unit mass of desolvated sealant delivered. This is an important reason for heating the bulk flow gas into and through the duct. Significant electrical power may be required for heating the bulk flow gas depending on the size (volume of the ductwork) and leakage level of the ductwork being sealed, as well as the temperature and humidity of the ambient air being used for sealing. The heated bulk gas flow rate (and thus the heating requirement) is higher for longer (hence higher volume) or leakier ducts, and the heating requirement is also higher for high-humidity or low-temperature ambient air. Second, for a given liquid flow rate, the quantity of desolvated sealant delivered to the ducts is proportionately reduced by the amount of dilution. For common dilutions of one part sealant to nine parts diluent (a ratio of 1:9), sealing can take three times longer as compared to when one part sealant to three parts diluent (a ratio of 1:3) is sprayed, with other factors held constant. More simply stated, for the same liquid flow rate, the sealant mass flow rate is reduced by a factor of three due to the three times higher dilution. The injector and method of using the injector described here reduces the required sealant dilution, and thereby increases the sealant mass flow rate.

Another disadvantage found in current embodiments of both the '930 and '984 patents is the requirement that the ducts be connected to an external fan and spray apparatus, which may be difficult to install, and intrusive in inhabited buildings. In these situations, considerable time and expense may be required simply to gain access to the ducts and isolate the HVAC equipment from the aerosol particles.

The above disadvantages and more are addressed in the present apparatus and method of using the apparatus, yielding a much less intrusive system capable of in-situ duct sealing of previously installed duct systems in occupied commercial and residential buildings. By occupied, we refer to buildings tenanted and in normal use. For previously installed HVAC systems capable of creating sufficient gage air pressure (known in fluid mechanics as "pressure head", or more simply "head"), no external fan assistance is required to increase the head. This situation is frequently found in commercial structures that have higher-pressure fan systems, and more recently in residential high-pressure HVAC systems. In most homes, there is insufficient head produced to allow effective duct sealing, and an additional fan must be placed in series with, and in addition to, the originally installed fan in order to raise the head sufficiently to seal the ducts. The additional series fan creates sufficient additional differential pressure in the duct system to force sealant particles through existing duct leaks; the particles, in turn, seal the duct leaks. After sealing has been accomplished, the series fan is removed, leaving the original fan system intact. The current injector allows the sealant spray to be created internally within the duct system, thereby simplifying the connection of the external fan to the duct system and the isolation of the HVAC equipment from aerosol particles. Nearly all fan systems have doors for fan access, however the atomizers used by the earlier inventions for duct sealing applications did not allow use of those access doors to connect the external fan, as the aerosol particles were created right at the external fan, and would be blown through the fan and HVAC equipment, thereby unacceptably coating the equipment with sealant. The current injector allows the sealant spray and the external fan to be separated.

The present injector allows for easily patched access to architecturally covered ductwork, allowing for easy placement of compact injectors throughout the building duct system.

BRIEF SUMMARY OF THE INVENTION

In one embodiment, a first aerosol injector is disclosed, the injector comprising: a liquid tube, with a liquid tube orifice for ejecting a liquid to be atomized; a propellant cap comprising: an annular orifice, the annular orifice disposed around an inner cylinder, the inner cylinder passing through the propellant cap, the inner cylinder having an interior, the liquid tube disposed within the inner cylinder interior; an interior region flowing to the annular orifice; a gas line flowing a pressurized gas into the interior region, the gas line having a gas line heater, the gas line heater heating the pressurized gas to form a heated pressurized gas; a heat transfer region disposed between the inner cylinder and the liquid tube; where the heated pressurized gas is ejected from the annular orifice surrounding the liquid ejected from the liquid tube orifice, atomizing and heating the liquid.

In another embodiment of the first aerosol injector the heat transfer region is comprised of one or more materials with a thermal conductivity of preferably less than or equal to $$25 \frac{W}{m \, °K},$$

more preferably less than or equal to $$20 \frac{W}{m \, °K},$$

yet more preferably less than or equal to $$15 \frac{W}{m \, °K},$$

still more preferably less than $$10 \frac{W}{m \, °K},$$

and most preferably less than $$5 \frac{W}{m \, °K}.$$

In another embodiment of the first aerosol injector the heat transfer region is comprised of one or more materials selected from the group consisting of: essentially stagnant air, epoxy, plastic, stainless steel, glass fibers, fluorocarbons and glass. The heat transfer region is designed to limit heat transfer from the heated pressurized gas to the liquid to be atomized.

For each fluid, there is a potentially complex relationship between the fluid temperature distribution, mass flow rate, and time required for clogging. This is easiest to comprehend with epoxies, which have a time-temperature curing rate described by the Arrhenius equation $\kappa = Ae^{-B/T}$, where $\kappa$ is the rate constant of a reaction, T is the temperature in degrees Kelvin, and A and B are constants in a specific chemical system. In the Arrhenius equation, increasing temperature produces an increase in the reaction rate. In practical terms, if the rate is sufficiently increased so as to crosslink enough bonds in an epoxy resin, then the material hardens, causing clogging. In other suspended particulate liquids, a similar rate-temperature relationship likely exists, implying that increased temperatures imply increased clogging. When clogging occurs for a particular device at particular operating conditions, the liquid flow has reached a critical temperature. Keeping the liquid below this temperature precludes, or substantially reduces, clogging of the liquid.

In another embodiment of the first aerosol injector the liquid to be sprayed is selected from the group comprising sealant, adhesive, coating, and paint.

In another embodiment of the first aerosol injector the liquid tube has an essentially constant cross-sectional area in the heat transfer region. Although the term "tube" typically connotes a cylindrical shape, other closed conic sections or polyhedral shapes having essentially constant cross-sectional area in the heat transfer region could be used.

In another embodiment of the first aerosol injector the heat transfer region contains an ambient airflow; the ambient airflow is drawn by the heated pressurized gas exiting the annular orifice; whereby the ambient airflow cools the liquid tube, and prevents boiling of the liquid. Alternatively, the ambient airflow cools the liquid tube to sufficiently reduce heat transfer to keep the liquid below its critical temperature in the particular system.

In another embodiment of the first aerosol injector, a method of sealing a previously installed duct using the first aerosol injector is disclosed, the sealing method comprising: forming a duct access region through one side of a previously installed air duct, the air duct having an air flow with an air flow direction; inserting the aerosol injector into the previously installed air duct through the access region; aligning the aerosol injector with the direction of air flow in the duct; activating an air flow within the duct; and spraying a sealant through the aerosol injector to seal the duct in the direction of the air flow.

In another embodiment of the first aerosol injector, the aerosol injector produces an aerosol spray cone angle of preferably less than 20°, more preferably less than 15°, and most preferably less than 10°. The spray cone angle is ultimately controlled by varying the momentum distributions of the liquid and heated pressurized gas. When both momentum distributions are most closely aligned with the central axis of the liquid tube, the resultant spray cone angle will be narrowest. Conversely, if the heated pressurized gas has a momentum distribution significantly diverging from the central axis of the liquid tube, the spray cone angle will be much wider. The momentum distributions are best controlled by having aligned orifices having a characteristic length preferably five times or greater than the hydraulic depth of the flow, more preferably ten times, and most preferably 20 times. In such systems, divergent bulk momentum is collimated into the bulk flow momentum vector, as exemplified by pressurized water exiting a long pipe.

A method of sealing a previously installed duct is disclosed using the first aerosol injector, the method comprising: forming a duct access region through one side of a previously installed air duct; inserting an injector into the previously installed air duct through the access region; the injector with the longer direction of the duct; an air flow within the duct; and spraying a sealant through the injector to seal the duct in the direction of the air flow. In order to form the duct access region, it may first be necessary to make an access opening (usually, but not necessarily a hole) in a wall, floor, or ceiling.

In another embodiment of the aerosol injector, a second aerosol injector comprises: a liquid tube, with a liquid tube orifice for spraying a liquid; a gas cap comprising: gas nozzle, the gas nozzle having an open cylindrical wall, forming an outer diameter of an annular tube, a gas line feeding into the gas nozzle, a gas line heater for heating a pressurized gas in the gas line, forming a heated pressurized gas, a venturi bore disposed within the gas nozzle and passing through the gas nozzle, the venturi bore forming an inner diameter of the annular orifice; liquid tube passing through the venturi bore; a venturi region disposed between the inner diameter of the annular orifice and the liquid tube; where the pressurized gas introduced into the gas line is heated by the gas line heater, and exits the annular orifice as the heated pressurized gas, drawing ambient air through the venturi region, thereby forming a venturi flow; whereby the venturi flow cools both the inner annulus and the liquid tube, and thereby reduces heat transfer from the heated pressurized gas to the liquid tube.

In yet another embodiment of the aerosol injector, a third aerosol injector comprises: a liquid tube, with a liquid tube orifice for ejecting a liquid to be atomized; a gas cap comprising: annular orifice having an inner diameter, the annular orifice disposed around the liquid tube, the liquid tube having a portion disposed within the gas cap, the liquid tube forming the inner diameter of the annular orifice, the liquid tube having a constant cross section in the gas cap disposed portion; an interior region flowing to the annular orifice; a gas line flowing a pressurized gas into the interior region, the gas line having a gas line heater, the gas line heater heating the pressurized gas to form a heated pressurized gas; where the heated pressurized gas is ejected from the annular orifice surrounding the liquid ejected from the liquid tube orifice, atomizing and heating the liquid.

In another embodiment of the third aerosol injector, the liquid tube is comprised of one or more materials selected from the group having a thermal conductivity of preferably less than or equal to $$25 \frac{W}{m \, °K},$$

more preferably less than or equal to $$20 \frac{W}{m \, °K},$$

yet more preferably less than or equal to $$15 \frac{W}{m \, °K},$$

still more preferably less than $$10 \frac{W}{m \, °K},$$

and most preferably less than $$5 \frac{W}{m \, °K}.$$

In another embodiment of the third aerosol injector, the liquid is selected from the group comprising sealant, adhesive, coating, and paint. Virtually any liquid having material dissolved or suspended may be used as the liquid to be atomized.

In still another embodiment of the third aerosol injector, a method of sealing a previously installed duct using the third aerosol injector is disclosed, the sealing method comprising: forming a duct access region through one side of a previously installed air duct, the air duct having an air flow with an air flow direction; inserting the aerosol injector into the previously installed air duct through the access region; aligning the aerosol injector with the direction of air flow in the duct; activating an air flow within the duct; and spraying a sealant through the aerosol injector to seal the duct in the direction of the air flow. The spraying continues until sufficient pressure rise and decrease in ductwork flow rate is detected to signal completion of the duct sealing, as described in the '984 patent.

In another embodiment of the third aerosol injector, the third aerosol injector produces an aerosol spray cone angle of preferably less than 20°, more preferably less than 15°, and most preferably less than 10°. In the most preferably injector, dried or desolvated particles are created in the bulk flow prior to impingement on any duct surface, and have both bulk and small-scale eddy velocities the same as the uninjected bulk flow.

In still another embodiment of the aerosol injector, a fourth aerosol injector comprises: a spray nozzle apparatus having a spray tip formed of co-terminal, concentric elements, comprising: an innermost liquid tube for delivering to a liquid exit tip a liquid to be sprayed; an inner hollow member surrounding said liquid tube and defining a thermally insulating space between the innermost liquid tube and the hollow member; and an outermost propellant cap defining a propellant delivery and exit space between an outer surface of the inner hollow member and an inner surface of the propellant cap, said propellant delivery and exit space communicating with a delivery tube for heated propellant gas, whereby the heated propellant gas exiting the propellant delivery and exit space mixes with liquid exiting the liquid exit tip to form a spray.

In another embodiment of the fourth aerosol injector, the liquid exit of the liquid tube and the propellant exit space essentially define a plane orthogonal to the spray direction.

In another embodiment of the fourth aerosol injector, the thermally insulating space is occupied by air flowing into the nozzle apparatus and out of the insulating space adjacent the liquid tip exit.

In another embodiment of the fourth aerosol injector, the thermally insulating space is provided by a thickness of the innermost liquid tube, said innermost liquid tube being one or more of the group comprising epoxy, plastic, stainless steel, glass fibers, fluorocarbons and glass.

In another embodiment, the present injector may be further characterized as comprising a spray nozzle apparatus having a spray tip formed of co-terminal, concentric elements. That is, the elements of the nozzle, when viewed end on, are co-terminal in that they terminate in approximately the same area, looking into the direction of spray. This area may be configured to form a planar array in the various exit tips lie in essentially the same plane. This planar array may be varied somewhat by varying the lengths of the various delivery tubes, but is adapted to provide a mixing of liquid and propellant immediately downstream of the exit. The planar array is orthogonal, i.e. at right angles to, a line drawn through the center of the spray cone.

The elements are concentric in that the primary elements, liquid tube, inner hollow member and propellant cap (described below) are configured to provide flow channels that are radially adjacent and may be viewed as symmetrical about a central axis. The elements need not be exactly symmetrical, but may be varied according to design parameters in accordance with the present teachings.

In another embodiment, a spray nozzle comprises: an innermost liquid tube for delivering to a liquid exit tip a liquid to be sprayed; an inner hollow member surrounding said liquid tube and defining a thermally insulating space between the innermost liquid tube and the hollow member; and an outermost propellant cap defining a propellant delivery and exit space between the inner hollow member and the propellant cap, said propellant delivery and exit space communicating with a delivery tube for heated propellant gas.

The innermost liquid tube is preferably cylindrical, but other shapes may be employed. The inner hollow member is also preferably cylindrical, and is referred to below as an "inner cylinder." The outermost propellant cap provides a receiving chamber for heated propellant gas. The heated propellant gas is prevented from heating the liquid by a thermally insulating space, which may be flowing air or other insulating material, as described above. This thermally insulating space is alternatively known as the heat transfer region. The air flows into and out of the nozzle by a venturi effect created by the spray.

The heated propellant gas exiting the propellant delivery and exit space mixes with liquid exiting the liquid exit tip to form a spray because the exit areas are located in close proximity with each other.

In one embodiment of the spray nozzle apparatus, the thermally insulating space is provided by a thickness of the innermost liquid tube, said innermost liquid tube being one or more of the group comprising epoxy, plastic, stainless steel, glass fibers, fluorocarbons and glass. That is, the thickness of the innermost liquid tube is such that the liquid tube itself has insulating properties; the innermost liquid tube is adjacent to, and in contact with the propellant delivery space and insulates the liquid from the heated propellant gas.

BRIEF DESCRIPTION OF THE SEVERAL VIEWS OF THE DRAWINGS

The invention will be more fully understood by reference to the following drawings, which are for illustrative purposes only.

DETAILED DESCRIPTION OF THE PREFERRED EMBODIMENT

In general, the present compact aerosol sealant injector provides nebulization or atomization of a pressurized liquid supply at a location near the nozzle tip. When the liquid supply is ejected in close proximity to the propellant, turbulent mixing occurs, forming a fine liquid mist, or liquid spray. The turbulent mixing phenomenon is extremely complex, depending on variables such as: relative flow velocities, densities, viscosities, surface tensions, and temperature distributions, etc., in both flows. Further representative references regarding the physics and fluid dynamics of atomizers and sprayers, incorporated herein by reference, are: *Atomization and Sprays*, by Arthur H. Lefebvre, Hemisphere Publishing Company, 1978; and *Liquid Atomization*, by L. Bayvel and Z. Orzewchowski, Taylor & Francis, 1993. This phenomenon becomes yet more complex when a heated propellant gas is used to desolvate or dry particles in the liquid supply.

Heating the propellant gas has many advantages. The fine liquid mist initially has a very high surface area to volume ratio, which leads to rapid desolvation. Additionally, since the liquid mist is heated by the bulk propellant flow, solvent evaporation occurs at an even higher rate due to the increase of the solvent vapor pressure. Nearly all solvents exhibit higher vapor pressure with temperature. Higher temperatures typically imply decreased viscosity and surface tension, both of which tend to induce particulate breakup into fine particles. These effects combine to quickly reduce the liquid mist particles to a cloud of individual particles without significant remaining liquid diluent. As the diluent of the diluted sealant particles is reduced, the particle surface area to mass ratio increases yet further, which leads to an increased tendency for the particles to remain in suspension of the bulk duct gas. With a higher fraction of particles suspended, there is less particle settling, and consequently improved sealing in duct sealing applications over longer duct distances, as previously discussed in the '984 patent.

In some sprays, dilution is unnecessary. In other sprays, a diluent may be added to adjust the resultant desolvated sealant particle to achieve a particular size. By being able to tailor the particle size, optimal sealant particle sizes may be obtained for optimal sealing.

By heating just the propellant gas, heating requirements for the bulk air flow in the duct are reduced or eliminated, and the overall heating energy requirements are reduced considerably, further making the sealing system more compact and less intrusive. Furthermore, by propelling the sealant with a heated gas stream, less solvent is needed to spray the sealant, thereby increasing the mass flow rate of the sealant, and thus the rate of sealing.

When the inventors initially began using heated propellant gas, it was discovered that the traditional spray nozzles would quickly clog, disrupting the duct sealing process. This occurred with a debilitating frequency to the point that a new nozzle with dramatically reduced clogging was created. This nozzle has such a great reduction in clogging frequency that it is referred to as the clog resistant nozzle.

Clogging in spray nozzles may typically be classified in three categories: steady state operation clogging in continuous use, clogging occurring during a prolonged break period while not spraying, and cyclical clogging related to the number of intermittent sprays and breaks. Additionally, when heating a liquid for spraying, it has been found that the liquid may be more prone to clogging.

Heat-induced clogging is reduced by thermally isolating the heated propellant gas from the liquid to be atomized until both exit the nozzle. The present injector and method of using the injector also combines localized direct propellant gas heating with a small spray cone angle to allow injection directly within a duct—even ducts with narrow dimensions. By using tubing for liquid injection, which is straight with constant cross-sectional area, the present injector further reduces clogging, and increases cleaning and liquid-line replacement efficiency. Clogging due to reductions in cross-sectional area within the heated zones is dramatically reduced. Should clogging occur in the liquid tube, a suitably sized wire readily accomplishes cleaning. Should such cleaning become impossible, replacement of the liquid tube within the heated zone is easily accomplished given the embodiments described below.

A. Clog-Resistant Compact Aerosol Sealant Injector Nozzle

The novel injector nozzle design disclosed herein addresses several important issues useful for general spraying operations, and more particularly duct sealing operations. In both of these operations, a liquid comprising dissolved chemicals or suspended particles is sprayed. Typical liquids include but are not limited to paints, adhesives, coatings, solvents, particulate suspensions, colloidal suspensions, gasses, dissolved gasses, or other fluids, as well as combinations and mixtures of these, and particularly dilutions and solvents added to these. For simplicity, the aforementioned liquid will interchangeably be referred to herein as a liquid, sealant, coating, paint or adhesive.

Many of the liquids described in the paragraph above tend to clog sprayers. This clogging problem is frequently exacerbated when the liquid is heated. Inadvertent heat transfer from the propulsion gas (or propellant gas) to the liquid to be sprayed can result in the "cooking" or "baking" of the liquid by boiling off of the liquid solvent, premature agglomeration, aggregation, or chemical reactions, all of which separately or in combination tend to induce clogging by reaching a critical temperature in the liquid. Preventing this type of heat induced clogging is achieved by minimizing heat transfer between the unheated liquid to be sprayed and the heated propulsion gas until just outside their respective spray orifices, thereby maintaining the unheated liquid below its critical temperature.

Special heat transfer minimization methods are used in the nozzle to limit heat transfer from the heated propulsion gas to the liquid flow prior to liquid efflux. In one embodiment of the nozzle, the high velocity of the heated gas efflux creates a venturi-generated low pressure region, which is in turn used to draw ambient, non-heated air, over a tube containing the liquid to be sprayed, thus minimizing heat transfer from the heated propulsion gas to the sealant. The pressure of the low-pressure region may be obtained by the well-known Bernoulli equation widely used in hydraulics and fluid mechanics. The result is greatly reduced clogging of the spray nozzle. Other embodiments employ thermal insulation techniques in various configurations to minimize heat transfer.

It has been found that the liquid tube is optimally straight, and with a constant cross section, throughout the region where any significant heat transfer is taking place, that is, the region that contains heated propellant in close proximity to the liquid tube. Restating this, it has been found by the inventors that both changes in cross section and changes in flow direction when heat is entering the liquid tube tend to induce more frequent clogging. The optimal embodiment found for the liquid tube has been a straight cylindrical tube, which has both constant cross-section and is straight. The tube most preferably has low thermal conductivity (e.g. stainless steel rather than brass or copper) to further minimize heat transfer.

The resultant compact injector can be packaged into a cylindrical volume small enough to place into holes formed through an architectural covering, e.g. a wall, ceiling, or even a structural member, and through the duct. The depth of the duct's near and far wall are then measured. The injector is then adjusted to minimize deposition near the injection point, preferably a depth of 55% of the duct depth for horizontal ducts in ceilings, 45% for floors. Mid depth, or 50% insertion, is used for vertical ductwork with the flows moving either up or down. Any of these injector placement locations may be moved all the way to either insertion extent, however, as much as 50% of the sprayed liquid is then immediately deposited on the proximal duct surface, resulting in decreased duct sealing rates.

The compact injector is an extremely efficient method for sealing installed ductwork systems, especially those found in occupied large commercial buildings. For these large ductwork systems, several compact aerosol sealant injectors are installed directly in the ducts downstream of sensitive ductwork components, such as fans and heat exchangers. The injectors may then be run either sequentially or simultaneously as required with existing fans alone, or with existing fans in conjunction with one or more differential pressure augmenting series fans.

Prior to this compact injector, commercial aerosol sealant injection faced several problems achieving multiple simultaneous injection in installed duct-work systems: 1) due to the bulky dimension of the previously existing compact aerosol-sealant injectors, it took too much time to install, remove and restore the duct system after injection; 2) prior injectors typically had wide spray cone angles, meaning that they could not be used to inject at adequate sealant flow rates in duct with small cross-sectional dimensions, since the spray would principally be deposited in the immediate vicinity of the injector; 3) prior injectors typically created relatively large particle sizes, which meant that the sealant had to be diluted to reduce particle size, and therefore required significantly more electrical power per unit solid sealant material produced; and 4) electrical power availability, duct dimensions, and low sealing rates limited duct sealing applications.

B. Nozzle Sprayer Assembly

Figure 1:
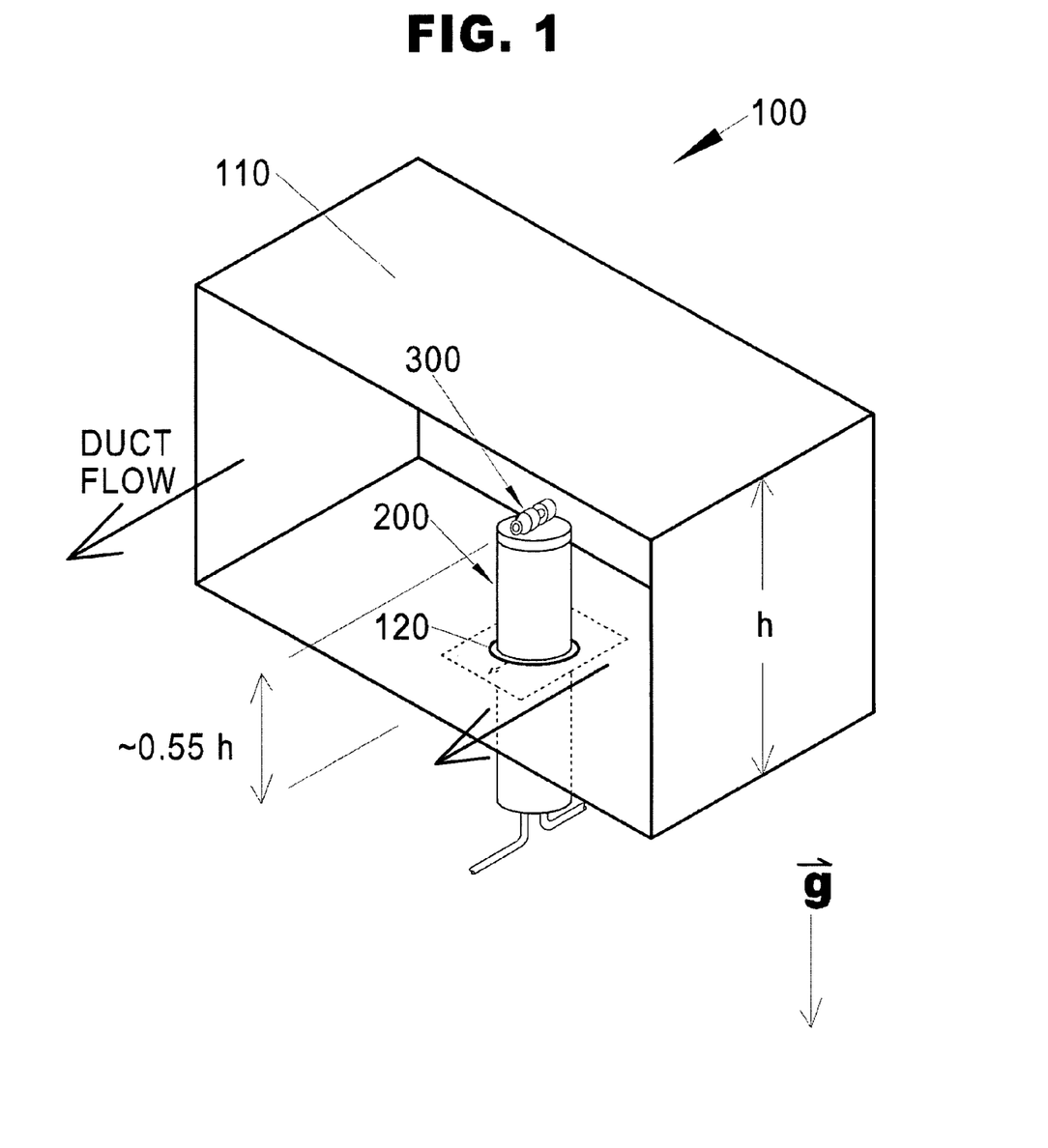
FIG. 1 is a perspective view of a compact sprayer assembly placed in a cut away section of duct for a duct sealing operation.

Refer now to FIG. 1 depicting a compact injector duct sealing operation 100. A compact injector 200 comprising a nozzle assembly 300 (described in detail later in FIGS. 2 and 3) is inserted through a duct 110 section, having a duct access opening 120. The nozzle assembly 300 is aligned in the direction of duct flow, at a vertical position of preferably about 40-50%, most preferably 55%, of the height "h" of the duct.

Figure 2:
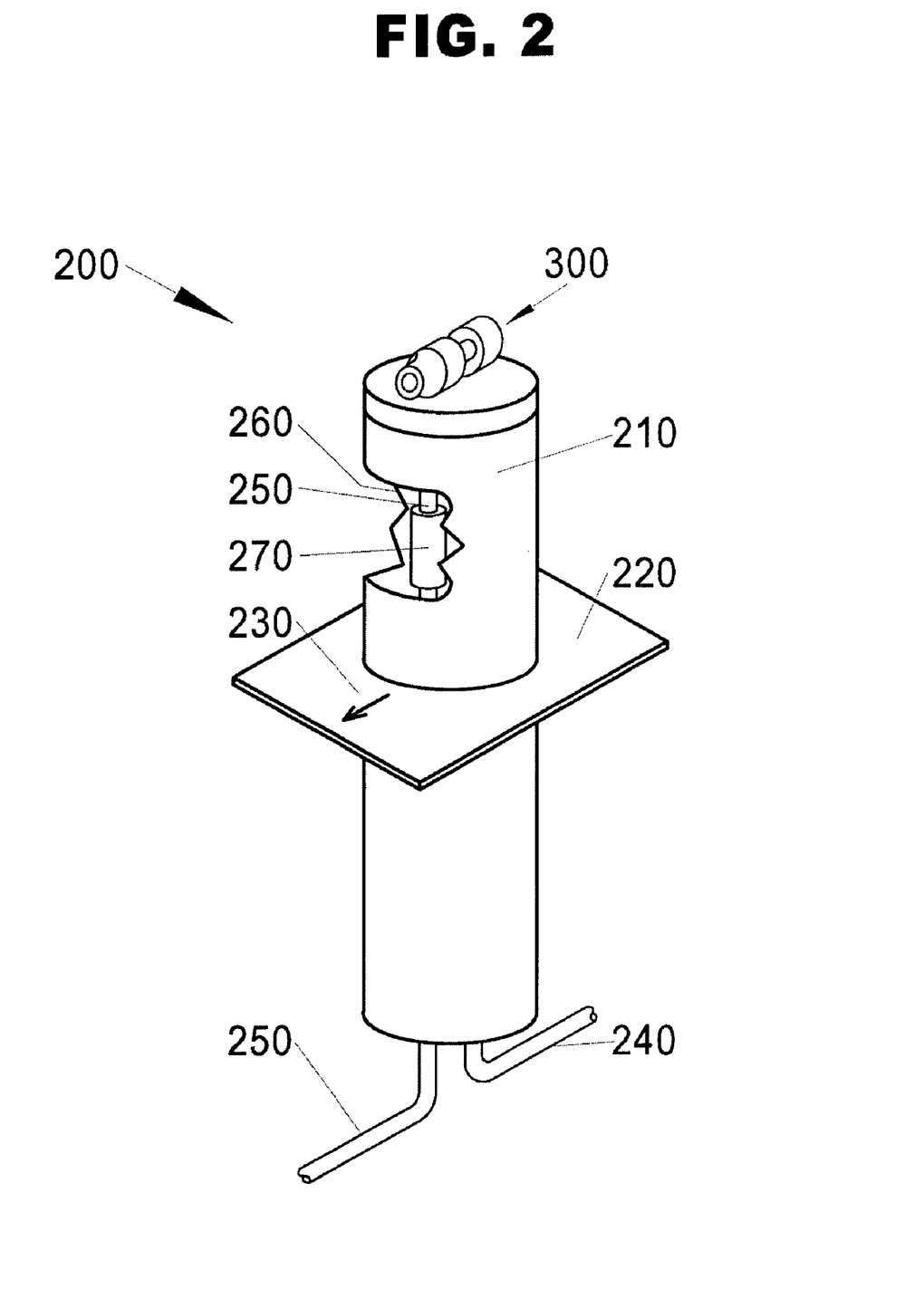
FIG. 2 is a partially cut away view of a compact sprayer assembly.

Refer now to FIG. 2. A compact injector 200 is comprised of a supporting tube 210, an alignment guide 220 surrounding the supporting tube 210 and adjustably attached thereto, with a directional indicator 230 on both sides of the alignment guide 220 indicating the direction of spray. The liquid to be sprayed (not shown) is pumped (also not shown) so that it enters through inlet tube 240, which ultimately connects to a pressurized liquid source (also not shown). Another fluid, preferably pressurized room temperature air, enters through propellant tube 250. A cutaway section 260 appears for illustrative purposes in supporting tube 210. The cutaway shows some of the propellant tube 250 shrouded within supporting tube 210, and an inline heater 270, which heats the contents of the propellant tube 250 prior to efflux at the nozzle assembly 300. The contents of the propellant tube 250 is a propellant gas. The propellant gas is preferably heated to 50-700° C., more preferably to 150-500° C., and most preferably to 300-400° C.

Figure 3A:
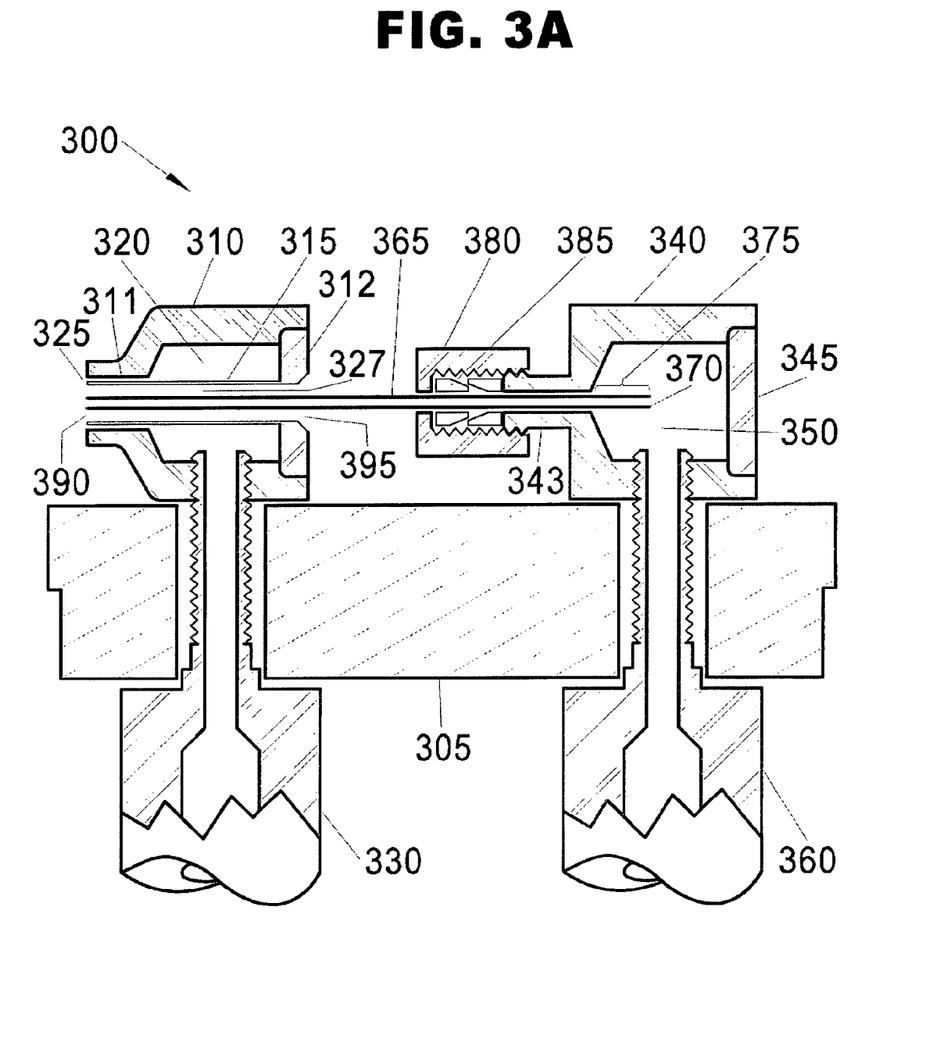
FIG. 3A is a partial cross-sectional view of the sprayer nozzle assembly with venturi cooling limiting heat transfer.

Refer now to FIG. 3A. The nozzle assembly 300 comprises a nozzle base 305, upon which is supported a propellant cap 310 that has an open cylindrical wall 311, and an interior propellant region 320 open only in the spray direction through the opening in the open cylindrical wall 311. The propellant cap 310 also has a propellant seal piece 312 with an inner cylinder 315. The propellant seal piece 312 seals to the propellant cap 310 except for an annular orifice 325 formed by the open cylindrical wall 311 and the inner cylinder 315. The inner cylinder 315 is attached at one end to the propellant seal piece 312. In manufacture, the inner cylinder 315 is preferably formed by turning down the propellant seal piece 312 on a lathe so that the inner cylinder 315 is integral with the propellant seal piece 312. The inner cylinder 315 additionally surrounds a liquid tube 365. Heated air initially comes from the propellant tube 250 (shown on FIG. 2) through the inline heater 270 (also shown on FIG. 2), to the propellant cap inlet fitting 330, which positively retains the propellant cap 310 to the nozzle base 305.

Still referring to FIG. 3, a liquid cap 340 is similarly sealed with a liquid cap plug 345 to create an inner liquid region 350. The liquid cap 340 is similarly positively retained to the nozzle base 305 by liquid cap inlet fitting 360, which in turn connects to the liquid inlet tube 240 (shown in FIG. 2). The liquid tube 365 has an end 370 protruding a length 375 (of a predetermined distance) into the inner liquid region 350. This length is designed to prevent clogging, and can range from 1 to 20 liquid tube 365 outer diameters, more preferably 2 to 10 diameters, and most preferably 3 to 6 diameters. Alternatively, the length can be determined experimentally so as to reduce or eliminate clogging in the inner liquid region 350. The liquid tube 365 is sealed with a threaded compression member 380 driving a circumferential compression swaging member 385 (in the art, this is typically referred to as a ferrule, but may be made of aluminum, brass, other metals, or plastics instead of ferrous materials) to seal against a male threaded extension 343 protruding from the liquid cap 340 on the side facing the annular orifice 325. The liquid tube 365 passes from the inner liquid region 350 through the interior bore of the inner cylinder 315 of the propellant seal piece 312 attached to the propellant cap 310, leaving an annular space sufficient to draw ambient air through a venturi entrance 395 formed by the propellant seal piece 312, over the outer diameter of the liquid tube 365, and to the venturi exit 390.

C. Flow Paths in the Clog-Resistant Injector Nozzle

Figure 4:
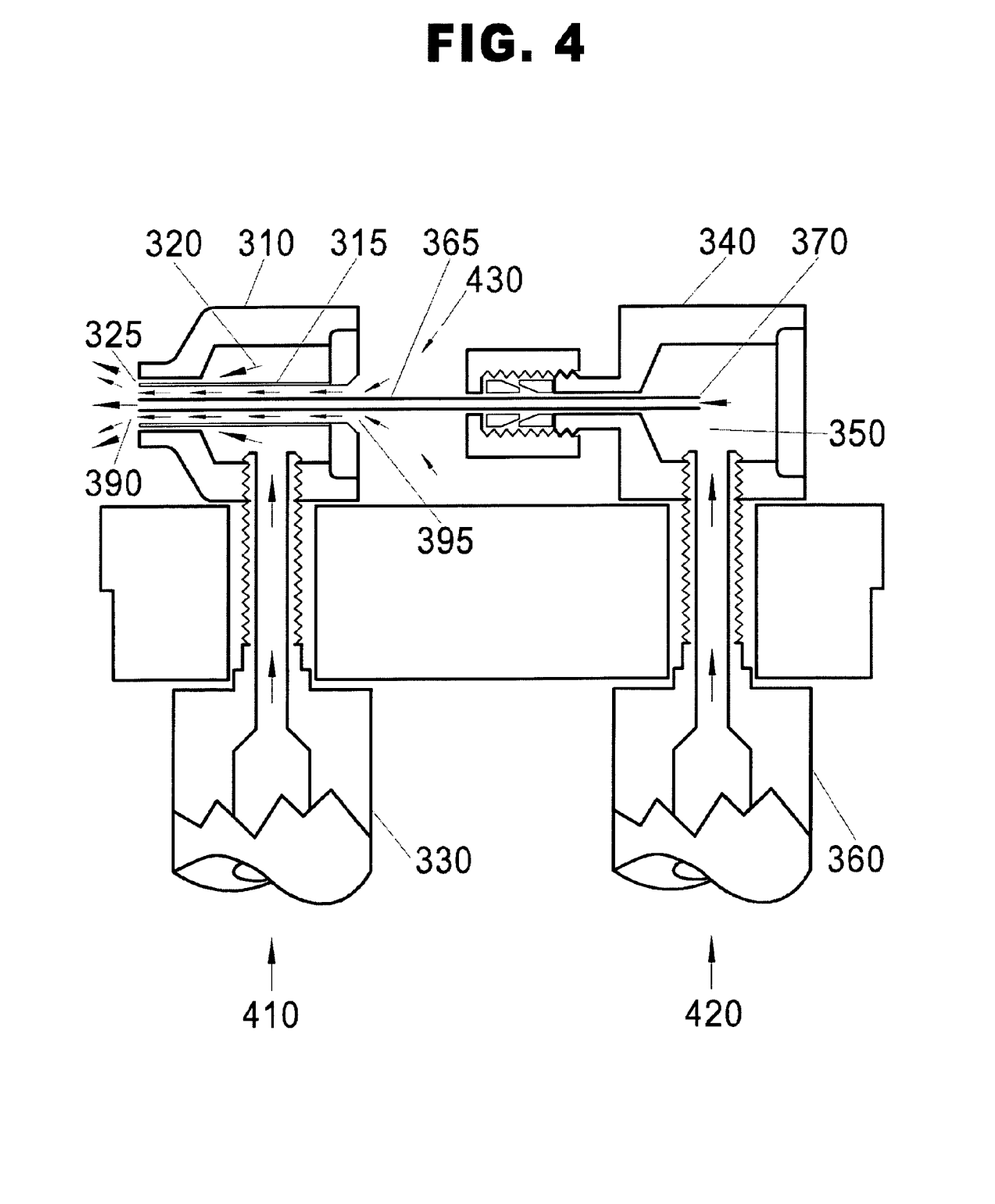
FIG. 4 is a partial cross-sectional view of the sprayer nozzle assembly, with the various flow patterns depicted.
Figures 5A, 5B:
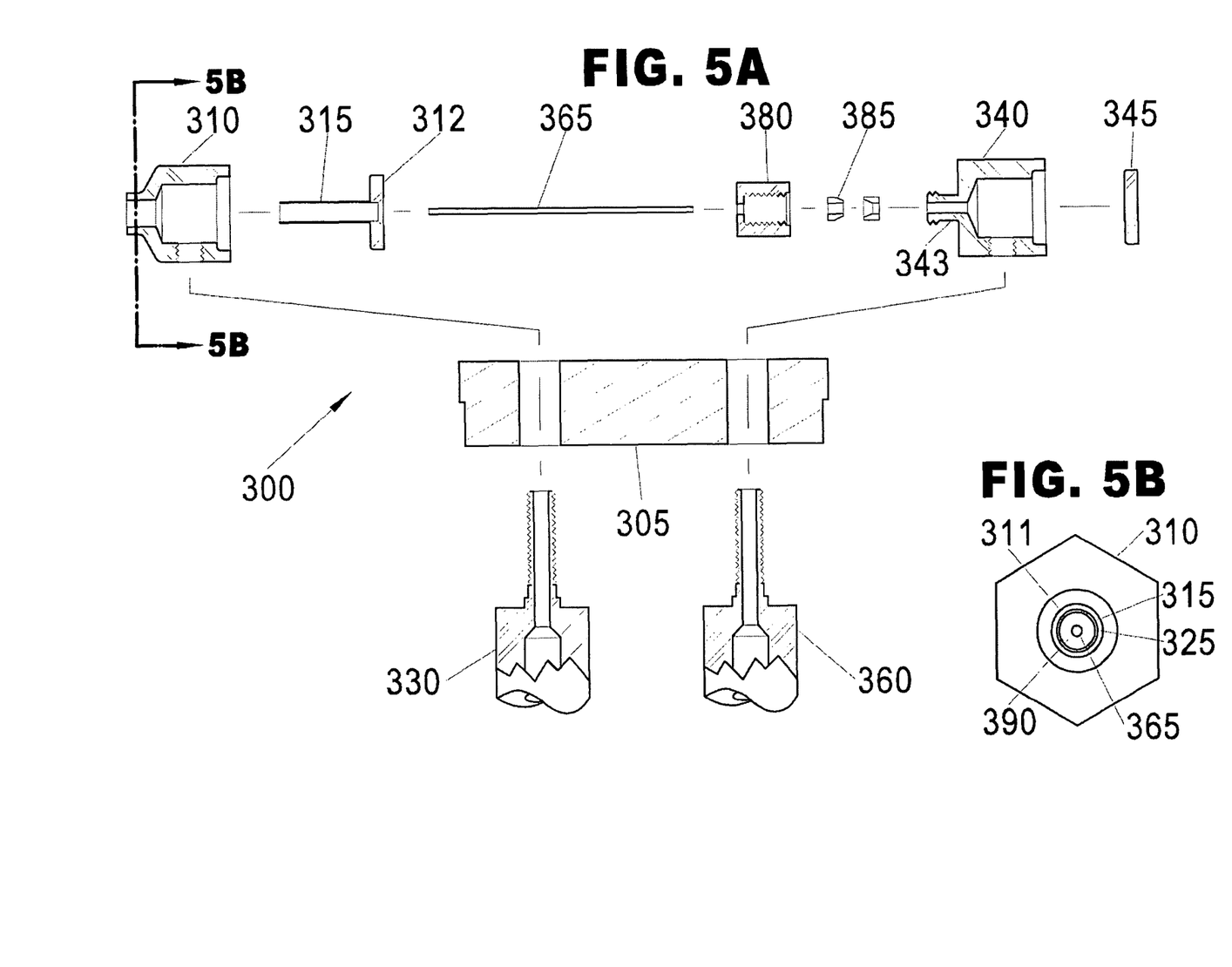
FIG. 5A is an exploded cross-sectional view of the sprayer nozzle assembly.
FIG. 5B is the sprayer nozzle assembly viewed on end from the direction of spray.

Refer now to FIG. 4. The heated propellant flow 410 passes through the propellant cap inlet fitting 330, and flows to the propellant cap 310 open interior propellant region 320. The propellant cap 310 is typically close to the bulk temperature of the heated propellant flow 410. The propellant flow is then emitted from the annular gas orifice 325 as a propellant gas orifice efflux. Similarly, the liquid flow 420 passes through the liquid cap inlet fitting 360 and proceeds to the liquid cap 340 inner liquid region 350. The liquid flow 420 proceeds to enter the liquid tube 365 at inlet end 370, where it traverses the liquid tube 365 and ultimately exits in close proximity to the annular orifice 325, as a liquid efflux. Both the heated propellant flow 410 and the liquid flow 420 are pressure driven either directly or indirectly by external pressurization equipment such as pumps or compressed gas.

The propellant flow 410 creates a low pressure region adjacent to the annular orifice 325, which operates to draw an ambient air flow 430 through a venturi entrance 395, over the outer diameter of the liquid tube 365, and to the venturi exit 390. This ambient air flow 430 operates to minimize conducted and convected heat transfer from the heated propellant flow 410 (which is in contact with the outer bore of the inner cylinder 315), to the interior bore of the inner cylinder 315 and thence to the liquid tube 365. Additionally, should any heat be radiatively transferred from the inner bore of the inner cylinder 315 to the liquid tube 365, the continual incoming stream of ambient air flow 430 acts to reduce the liquid tube 365 temperature to ambient by contact convection. The combination of these flows tends to keep the liquid flow 420 at near ambient temperatures, which operates to greatly reduce the frequency of heat-induced liquid tube 365 clogging.

Figure 3B:
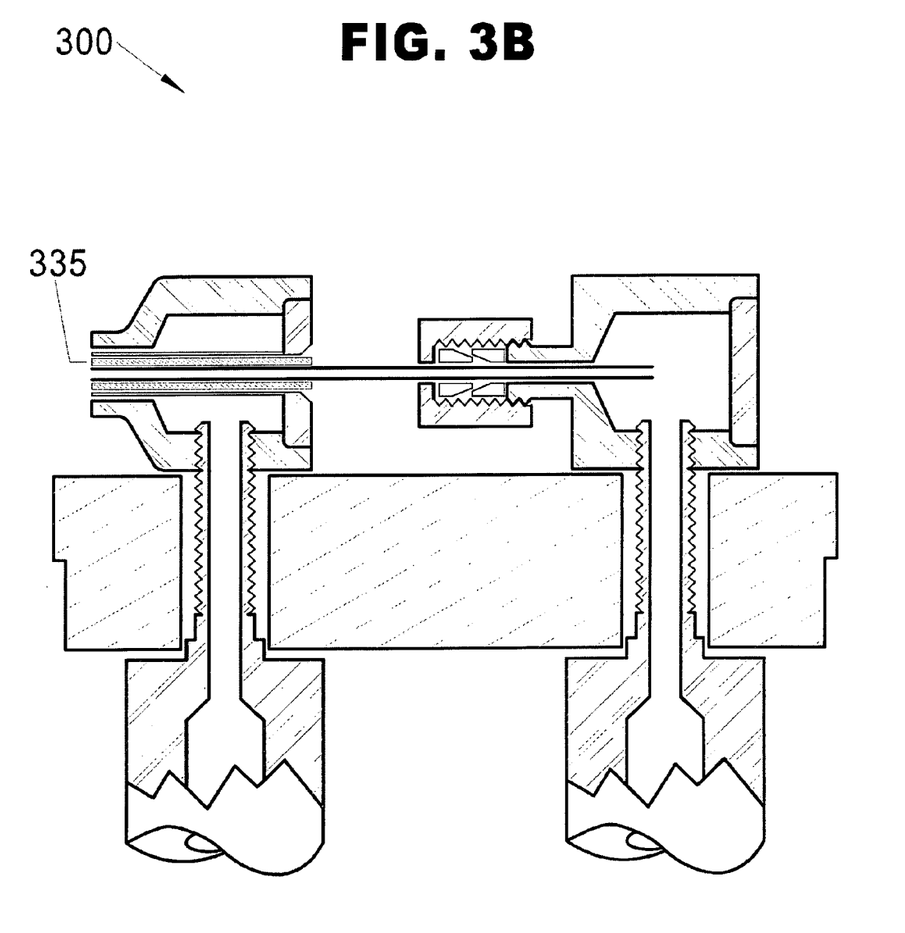
FIG. 3B is a partial cross-sectional view of the sprayer nozzle assembly with an insulator limiting heat transfer.

Refer now to FIGS. 3B and 4. In an alternative injector embodiment, indicated in FIG. 3B, a lamination of one or more insulation materials 335 operate to minimize heat transfer from the interior bore of the inner cylinder 315 to the liquid tube 365. In a typical application, any material with sufficiently low thermal conductivity may be used to thermally isolate (or effectively insulate by reducing heat transfer) the heat transfer region defined between the inner cylinder 315 and the liquid tube 365. Again, the measure of "sufficiently low" can be determined by the mass flow rate of the liquid flow 420, and differential temperatures of the liquid flow 420 and propellant flow 430. Any insulator with "sufficiently low" thermal conductivity will greatly reduce or completely eliminate clogging of the liquid flow 420 by keeping the liquid below its critical temperature for clogging.

In another embodiment, an insulating material limits heat transfer. Insulators as used here are materials having a relatively low room temperature thermal conductivity in Watts per meter per degree Kelvin $$\left(\frac{W}{m\ {}^{\circ}\mathrm{K}}\right)$$

when compared to brass $$\left(107\frac{W}{m\ {}^{\circ}\mathrm{K}}\right),$$

copper (386), and aluminum (229). Examples of some of these insulators are solids such as stainless steel $$\left(16\frac{W}{m\ {}^{\circ}\mathrm{K}}\right),$$

Pyrex glass (1.09), window glass (0.78), and porcelain enamel (15.5). Other insulator examples may be cast epoxy (0.52) or plastics such as melamine (0.48), glass filled nylon (0.5), nylon with no glass filling (0.24), polyethylene (0.33), fluorocarbons polytrifluorochloroethylene (PTFCE) (0.251), polytetrafluorethylene (PTFE) (0.24), polyvinylidene fluoride ($PVF_2$) (0.24), 40% glass filled polycarbonate (0.222), and still, or stagnant air (0.026).

Many other types of plastics may be used as insulators in this injector subject to operating temperature limits, such as the thermoplastic resins, which include: (1) acrylonitrilebutadiene-styrene (ABS) resins; (2) acetals; (3) acrylics; (4) cellulosics; (5) chlorinated polyethers; (6) fluorocarbons, such as polytrifluorochloroethylene (PTFCE), polyvinylidene fluoride ($PVF_2$), polytetrafluorethylene (PTFE), polychlorotrifluoroethylene (CTEE), and fluorinated ethylene propylene (FEP); (7) nylons (polyamides); (8) polycarbonates; (9) polyethylenes (including copolymers); (10) polypropylenes (including copolymers); (11) polystyrenes; and (12) vinyls (polyvinyl chloride). Alternatively, many thermosetting resins may also be used as an insulator, including: (1) alkyds; (2) allylics; (3) the aminos (melamine and urea); (4) epoxies; (5) phenolics; (6) polyesters; (7) silicones; and (8) urethanes.

For the purposes of this injector, an effective insulator will have a thermal conductivity of less than 25 Watts per meter per degree Kelvin $$\left(\frac{W}{m\ {}^{\circ}\mathrm{K}}\right),$$

preferably less than 20, more preferably less than 10, and most preferably less than $$5\frac{W}{m\ {}^{\circ}\mathrm{K}}.$$

Figure 3C:
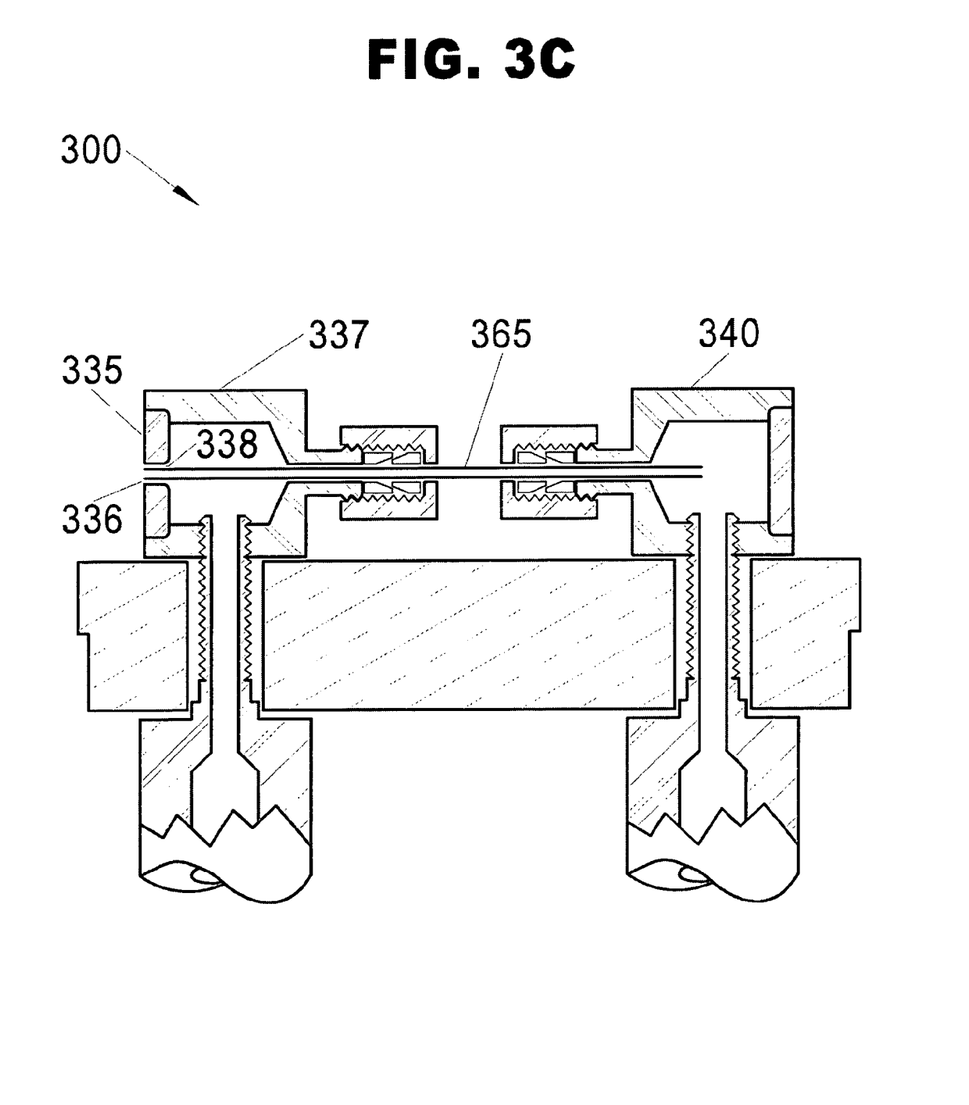
FIG. 3C is a partial cross-sectional view of the sprayer nozzle assembly with the liquid tube partially disposed within the gas cap, and thereby limiting heat transfer.

FIG. 3C shows yet another embodiment of the aerosol injector where a modified propellant cap 337 resembles the liquid cap 340. A propellant cap plug 335 has a central hole 336 allowing the placement of the liquid tube 365 within the central hole 336. An annular orifice 338 is formed with the liquid tube 365 forming an inner diameter, and the central hole 336 of the propellant cap plug 335 forming the outer diameter. In this configuration, the relative dimensions, mass flow rates, and temperatures are such that clogging is still reduced below a usable level.

This mode of operation preferably uses a stainless steel liquid tube 365 acting as an insulator to reduce heat transfer. The liquid tube 365 may also be a laminate comprised of one or more low conductivity materials. The heat that is transferred is in turn carried away by the liquid tube 365 contents before so much heat is transferred as to precipitate substantial clogging. In this manner, the liquid is kept below its critical temperature.

D. Exploded View of the Clog-Resistant Injector Nozzle

Refer now to FIG. 5A, which details the individual components of the clog-resistant injector nozzle 300 as earlier depicted in FIG. 3A. The various assembly lines on FIG. 5A describe how the components are assembled. Assembly proceeds with the propellant cap inlet fitting 330 being inserted into the nozzle base 305. The propellant cap 310 is then attached to the propellant cap inlet fitting 330. The propellant cap 310 has previously had propellant seal piece 312 inserted. Similarly, the liquid cap inlet fitting 360 is inserted into the nozzle base 305, where the liquid cap 340 is attached. The liquid cap 340 has previously been sealed with the liquid cap plug 345, and has been loosely attached to the threaded compression member 380 encapsulating and driving the circumferential compression swaging member 385 to seal against a male threaded extension 343 protruding from the liquid cap 340 on the side facing the annular orifice 325. Once the propellant cap 310 and liquid cap 340 are assembled, the liquid tube 365 is inserted through the propellant cap 310 into the liquid cap 340, and secured by tightening the threaded compression member 380, which drives the circumferential compression swaging member 385 to seal against the liquid tube 365 and the threaded male extension 343.

Refer now to FIG. 5B, which is viewing the assembled propellant cap components along the axis of the liquid tube 365. Starting at the outer periphery of the propellant cap 310 (which is typically machined from hexagonal brass stock), the open cylindrical wall 311 is observed. The open cylindrical wall 311 forms the outer diameter of the annular orifice 325, whose inner diameter is formed by the inner cylinder 315 projecting off of the propellant seal piece 312 (shown in FIG. 5A). The venturi exit 390 is another annular orifice defined by the interior of the inner cylinder 315, and the outer surface of the liquid tube 365. Liquid flows from the terminus of the liquid tube 365, otherwise referred to as the liquid tube orifice.

All publications, patents, and patent applications mentioned in this specification are herein incorporated by reference to the same extent as if each individual publication or patent application were each specifically and individually indicated to be incorporated by reference.

The description given here, and best modes of operation of the invention, are not intended to limit the scope of the invention. Many modifications, alternative constructions, and equivalents may be employed without departing from the scope and spirit of the invention.

We claim:

1. A method comprising:
   a) forming a duct access region through one side of a previously installed air duct, wherein the air duct has an air flow with an air flow direction;
   b) inserting an aerosol injector into the previously installed air duct through the access region, wherein the aerosol injector comprises
      i) a liquid tube having a liquid tube orifice for ejecting a liquid sealant to be atomized; and
      ii) a propellant cap, wherein said propellant cap comprises an annular orifice disposed around an inner cylinder, wherein the inner cylinder passes through the propellant cap, the inner cylinder has an interior, and the liquid tube is disposed within the inner cylinder interior; an interior region flowing to the annular orifice; and a gas line flowing a pressurized gas into the interior region, wherein the gas line has a gas line heater that heats the pressurized gas to form a heated pressurized gas; and a heat transfer region disposed between the inner cylinder and the liquid tube; wherein the heated pressurized gas is ejected from the annular orifice surrounding the liquid sealant ejected from the liquid tube orifice, atomizing and heating the liquid sealant;
   c) aligning the aerosol injector with the direction of air flow in the duct;
   d) activating an air flow within the duct; and
   e) spraying the liquid sealant through the aerosol injector to atomize the sealant, wherein the atomized sealant seals the duct in the direction of the air flow.

* * * * *